S. LOUVIERE.
FLY TRAP.
APPLICATION FILED APR. 4, 1913.
1,072,342.
Patented Sept. 2, 1913.
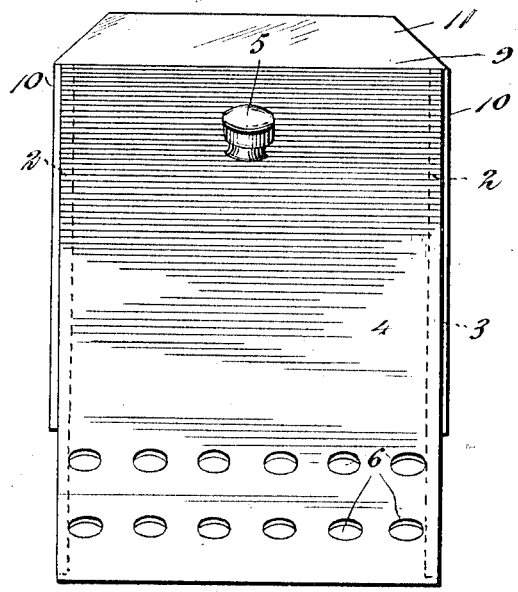
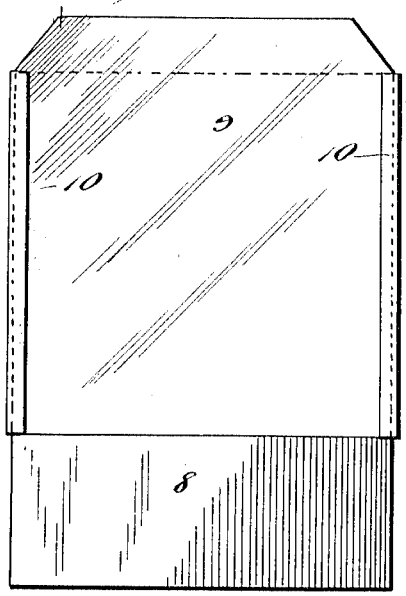
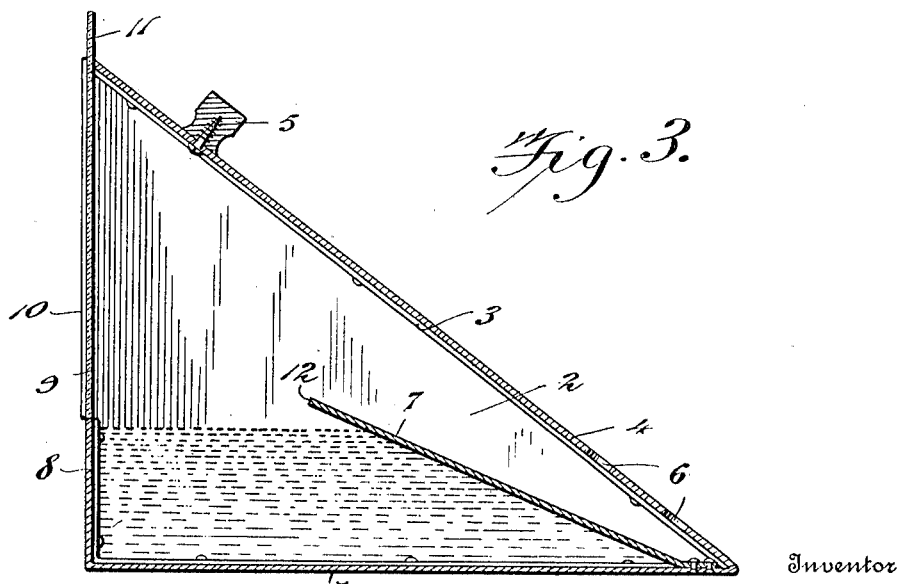
Witnesses
W. S. McDowell
Dudley B. Howard
Inventor
Samuel Louviere
By Victor J. Evans
Attorney

UNITED STATES PATENT OFFICE.

SAMUEL LOUVIERE, OF UNION, LOUISIANA.

FLY-TRAP.

1,072,342. Specification of Letters Patent. Patented Sept. 2, 1913.

Application filed April 4, 1913. Serial No. 758,855.

*To all whom it may concern:*

Be it known that I, SAMUEL LOUVIERE, a citizen of the United States, residing at Union, in the parish of St. James and State of Louisiana, have invented new and useful Improvements in Fly-Traps, of which the following is a specification.

My invention relates to a fly trap and has for its primary object to provide a trap body into which the flies may be lured by the presence of a suitable bait and which includes interiorly disposed means for drowning the flies after the same become entrapped within the body of the device.

A further object of the invention is to provide a trap of the character set forth having an opaque wall provided with a plurality of small apertures through which the flies may enter the interior of the trap body, and which is further provided with a transparent wall disposed oppositely with respect to the said opaque wall, the container for the drowning liquid being disposed adjacent the transparent wall so that the flies being attracted by the bait within the receptacle, will enter the openings in the opaque wall and, when they attempt to escape, they will naturally fly toward the transparent wall with the result that they will fall into the receptacle containing "soap suds" or other suitable liquid and will be drowned.

A still further object is the provision of a trap of the class described which is of the simplest possible construction so as to be inexpensive in the cost of manufacture and easy to operate, and whose angular arrangement of the walls and other operative parts is such as to render the trap most effective in use.

The invention consists in the features of construction, combination and arrangement of parts, hereinafter fully described and claimed, reference being had to the accompanying drawing, in which:—

Figure 1 is a front elevation of the trap. Fig. 2 is a rear elevation of the same; and Fig. 3 is a longitudinal, vertical sectional view taken through the device.

The trap, as illustrated in the accompanying drawing, is to be constructed almost entirely of thin sheet metal or other light-weight, opaque material. The base, or bottom wall 1 of the trap body is preferably rectangular in shape and triangular side walls 2 project upwardly from the base with their long edges 3 disposed forwardly. A front wall 4 constructed of similar, opaque material connects the long edges 3 of the side wall and is thus inclined upwardly and rearwardly, a handle 5 being provided thereon suitably near the upper edge thereof by which the trap may be carried readily from place to place. The front wall 4 is provided adjacent its lower edge with a plurality of relatively spaced, circular openings 6 through which flies, which have congregated upon the outer face of the said wall, may gain entrance to the interior of the trap body. An upwardly and inwardly inclined bait supporting wall 7 is provided within the body of the device connecting the side walls and bottom thereof adjacent the front wall 4 and is inclined at a lesser angle than the latter wall. Upon this supporting wall 7, molasses or other suitable substance may be spread to serve as a bait for attracting the flies. The rear wall of the trap body comprises a lowermost fixed section 8 of opaque material connecting the side walls and bottom 1, and an uppermost, slidable section 9 of transparent material such as glass or the like, which is mounted within the vertical guides 10 provided upon the rear edges of the side walls 2. This transparent wall section is extended upwardly past the upper edge of the wall 4 to provide a manipulating extension 11 which may be grasped in effecting the removal or insertion of the said wall section for purposes which will be set forth hereinafter.

The lower portion of the trap body forms a receptacle for an insecticide, such as soap suds, which may be poured into the same upon removal of the transparent rear wall section 9. As the rearmost edge 12 of the bait supporting wall 7 is disposed in spaced relation to the upper edge of the fixed section 8 of the rear wall considerable area of the soapy water is presented for the flies to fall into.

When the trap is properly supplied with insecticide and bait and is positioned in a suitable place, flies will be attracted by the bait and will gather upon the outer face of the front wall 4, whereupon they may gain entrance through the openings 6. Owing to the relative angular disposition of the opaque walls 4 and 7, the flies will, in their attempts to escape from the trap, whereupon they would naturally seek the light, fly swiftly in an inclined direction toward the transparent section 9 of the rear wall as they must necessarily fly rapidly in leaving the close quarters afforded between the walls 4 and 7 and in this particular direction, the flies will strike the wall section 9 with considerable force so as to become momentarily stunned by the shock, whereupon they will fall into the insecticide contained within the receptacle previously described and will become drowned therein.

When the liquid receptacle has become sufficiently full of dead flies, its contents may be emptied by withdrawing the slidable wall section 9 and by tipping or inverting the trap body. By holding the trap in inverted position and by pouring hot water through the apertures 6 in the front wall 4, those insects which may be lodged upon the bait supporting wall 7 may be drowned and washed off the said wall together with the bait positioned thereon, if it is so desired.

From the foregoing description, taken in connection with the accompanying drawing, it will be apparent that I have provided a simple and inexpensive trap which may be employed effectively for entrapping and destroying flies or any other like insects. I desire to have it understood, however, that I may resort to minor changes in the details of construction as found necessary in practice without departing from the scope of the invention.

Having thus described my invention, what I claim is:

1. A trap of the class described comprising a hollow body having a bottom wall, opaque side walls projecting upwardly from the bottom wall, an opaque inclined wall connecting the side walls and provided with perforations adjacent its lower edge, a transparent vertical wall connecting the side walls and disposed oppositely with respect to the said inclined connecting wall, and a bait support provided within the trap body beneath the perforated opaque wall, a receptacle for fluid insecticide being provided between the bait support and the said transparent wall.

2. A trap of the class described comprising a hollow body having a bottom wall, opaque side walls projecting upwardly from the bottom wall, an opaque inclined wall connecting the side walls and provided with perforations adjacent its lower edge, a transparent vertical wall connecting the side walls and disposed oppositely with respect to the said inclined connecting wall, and a bait support provided within the trap body beneath the perforated opaque wall and in angular relation thereto, a receptacle for fluid insecticide being provided between the bait supporting wall and the transparent wall of the body.

In testimony whereof I affix my signature in presence of two witnesses.

SAMUEL LOUVIERE.

Witnesses:
F. CHANVIN,
P. S. DANAS.

Copies of this patent may be obtained for five cents each, by addressing the "Commissioner of Patents, Washington, D. C."